United States Patent [19]

Mattila

[11] 4,427,228

[45] Jan. 24, 1984

[54] SHEET PILE HOIST DEVICE

[76] Inventor: Earl H. Mattila, Rte. 1, Box 324, Trimountain, Mich. 49966

[21] Appl. No.: 338,783

[22] Filed: Jan. 11, 1982

[51] Int. Cl.³ .............................................. B66C 1/36
[52] U.S. Cl. ............................... 294/83 R; 24/241 SB
[58] Field of Search ................. 294/67 A, 67 B, 78 R, 294/82 R, 83 R, 84, 91, 101, 104; 24/230.5 R, 232 R, 232 G, 233, 234, 241 P, 241 PP, 241 PS, 241 SP, 241 SB, 248 B, 250

[56] References Cited

U.S. PATENT DOCUMENTS

| 2,357,054 | 8/1944 | Muddiman | 294/83 R |
| 2,445,106 | 7/1948 | Dempster | 294/83 R |
| 3,792,892 | 2/1974 | Shields | 294/82 R |
| 4,277,093 | 7/1981 | Turley et al. | 294/104 X |

FOREIGN PATENT DOCUMENTS 310213 4/1929 United Kingdom ............. 294/82 R

*Primary Examiner*—Johnny D. Cherry

[57] ABSTRACT

An apparatus adapted to be connected to a hoisting cable and for lifting and carrying a sheet pile. The apparatus includes an elongated bar having an upper end adapted to be joined to the hoisting cable. A jig member projects from the lower end of the elongated bar, the jig member being adapted to extend through an opening provided in the upper end of the sheet pile, and the jig member including a first leg portion extending transversely to the elongated bar through the opening and a second leg portion perpendicular to the first leg portion and adapted to extend downwardly and to be positioned adjacent the side of the sheet pile opposite that engaged by the elongated bar. A latch member is provided for selectively restraining the elongated bar against the sheet pile. The latch member includes an arm pivotally joined to the elongated bar intermediate its opposite ends for movement between a first position and a restraining position. One end of the arm is adapted to extend over the upper end of the sheet pile when the latch member is in the restraining position, and a leg member is secured to that one end of the arm and is adapted to engage the opposite side of the sheet pile.

6 Claims, 3 Drawing Figures

SHEET PILE HOIST DEVICE

FIELD OF THE INVENTION

The present invention relates to apparatus for use in holding a structural member such as a sheet pile used in construction and more particularly to an apparatus for selectively positively engaging a sheet pile such that it can be lifted by a crane or the like.

BACKGROUND PRIOR ART

In the construction of structures employing sheet piles, the piles are set in place and are lifted and removed by connecting the piles to the hoist cable of a crane. The upper end of the sheet pile commonly includes a bore such that a hoisting cable can be connected to the upper end of the sheet pile. For a number of reasons, the conventional methods and apparatus providing for attachment of the hoisting cable to the upper end of the sheet pile are inconvenient, unduly labor intensive, time consuming, and in some cases, dangerous.

Attention is also directed to the following prior art patents which are cited as illustrative of related prior art apparatus, such patents including the Ely U.S. Pat. No. 4,216,987, issued Aug. 12, 1980; the Peltonen U.S. Pat. No. 3,809,270, issued May 7, 1974; and the Kurtz U.S. Pat. No. 1,651,607, issued Dec. 6, 1927. Attention is further directed to the Boissonnet U.S. Pat. No. 4,279,062, issued July 21, 1981; the Looker U.S. Pat. No. 3,074,136, issued Jan. 22, 1963; and the Matejicek U.S. Pat. No. 3,059,954, issued Oct. 23, 1962.

SUMMARY OF THE INVENTION

The invention provides an improved apparatus adapted to be connected to a hoisting cable and intended to provide a means for quickly and positively connecting the hoisting cable to a sheet pile or other similar structure. The apparatus of the invention provides a means for quickly clampingly engaging a sheet pile and a means for positively gripping the sheet pile such that it will not be accidentally dropped.

More particularly, the invention includes a sheet pile hoist adapted to be connected to a hoisting cable and for lifting and carrying a sheet pile having an opening adjacent its upper end. The jig includes an elongated bar having an upper end adapted to be joined to the hoisting cable and the elongated bar also being adapted to be positioned adjacent one side of the sheet pile. A jig member projects from the lower end of the elongated bar and is adapted to extend through the opening in the sheet pile. A second leg portion extends from the free end of the first leg portion, and substantially perpendicularly thereto, and is adapted to be positioned adjacent the opposite side of the sheet pile and to extend downwardly. Means are also provided for selectively restraining the elongated bar against one side of the sheet pile, the means for selectively restraining including a latch member having an arm including opposite ends, the arm being pivotally joined to the rigid member intermediate the opposite ends for movement between a first position and a restraining position. One end of the arm is adapted to extend over the upper end of the sheet pile when the latch member is in the restraining position. A leg member is secured to that end of the arm and so as to be transverse thereto and adapted to be positionable adjacent the opposite side of the sheet pile when the latch member is in the restraining position.

The sheet pile jig of the invention is quickly and easily attached to the sheet pile and provides for improved safety in handling the sheet pile. Another principal feature of the invention is that the sheet pile jig is also quickly and easily removed from the sheet pile and will fall away from the sheet pile automatically when a safety lever is released and when the tension in the hoisting cable is relaxed.

Various other features and advantages of the invention will be apparent from the following description of a preferred embodiment, from the claims and from the drawings.

DESCRIPTION OF A PREFERRED EMBODIMENT

Figure 1:
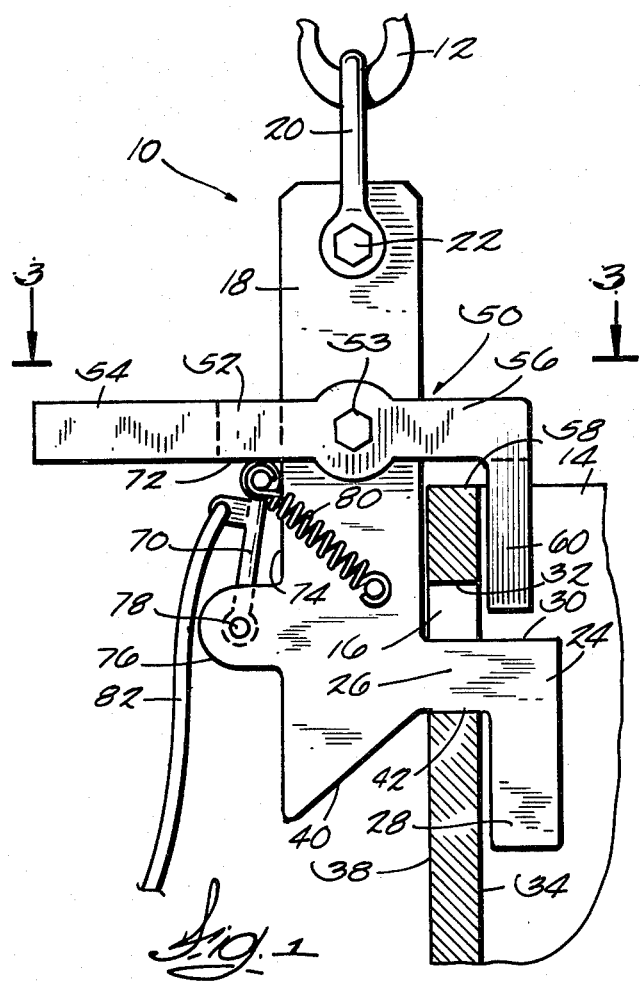
FIG. 1 is a side elevation view of an apparatus embodying the invention.

Illustrated in FIG. 1 is a sheet pile jig 10 embodying the present invention, the sheet pile jig 10 being joined to a hook 12 of a hoisting cable and intended to positively clampingly engage the sheet pile 14 such that the hoisting cable can lift the sheet pile 14. As illustrated, conventional sheet piles are provided with an aperture or opening 16 adjacent an upper end to facilitate connection of the sheet pile 14 to a hoisting cable.

The sheet pile jig 10 is comprised of an elongated rigid vertical strap or bar 18 having an upper end and a loop 20 joined to the bar 18 by a bolt 22, the loop 20 facilitating connection of the hook 12 of the hoisting cable to the sheet pile jig 10.

The sheet pile jig 10 also includes a leg member 24 integrally joined to the lower end of the elongated bar, the leg member 24 being adapted to extend through the opening in the sheet pile 14 to provide for engagement of the sheet pile jig 10 with the sheet pile. The leg member 24 includes a first leg portion 26 extending generally perpendicularly to the longitudinal axis of the elongated bar 18 and being adapted to extend through the opening 16 in the sheet pile 14. The first leg portion 26 includes a free end opposite that end of the first leg portion 26 integrally jointed to the vertical bar 18, and a second leg portion 28 is integrally joined to the free end of the first leg portion 26 and extends downwardly therefrom. The second leg portion 28 and the first leg portion 26 form a right angle, and the second leg portion 28 is adapted to be positioned adjacent that side of the sheet pile 14 opposite the side of the sheet pile engaged by the vertical bar 18.

One of the principal features of the sheet pile jig of the invention is that the sheet pile jig will automatically fall away from the sheet pile when the lever 70 is moved to a release position and when the hoisting cable permits the jig to fall away from the sheet pile. More particularly, in operation, when the leg member 26 is placed through the opening 16 in the sheet pile, the upper surface 30 of the first leg portion 26 can engage the upper surface 32 of the opening 16 in the sheet pile such that the sheet pile jig 10 can carry the sheet pile 14, and the downwardly extending leg portion 28 can engage the surface 34 of the sheet pile to restrain the sheet pile jig against the sheet pile 14.

Figure 2:
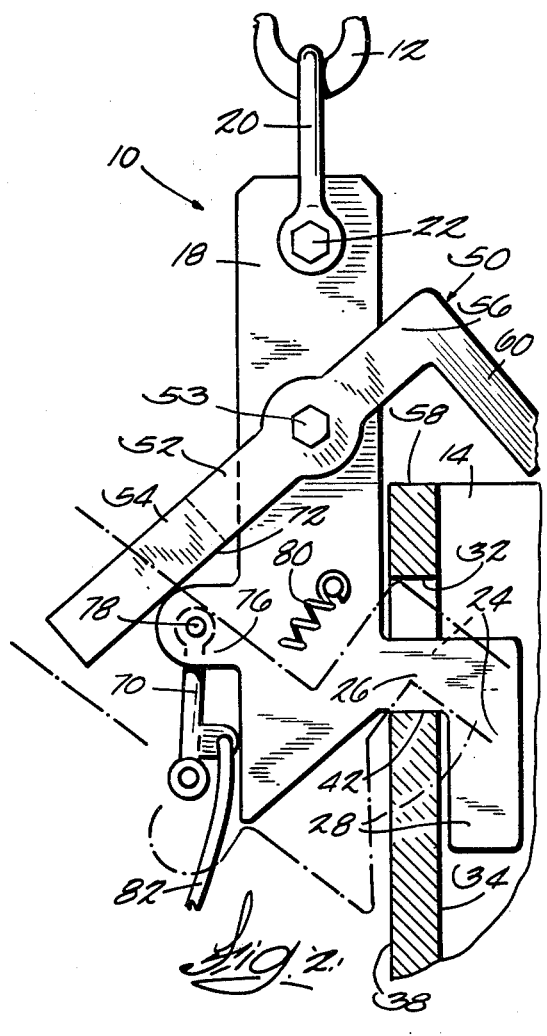
FIG. 2 is a view showing the sheet pile jig of FIG. 1 engaging the sheet pile.
Figure 3:
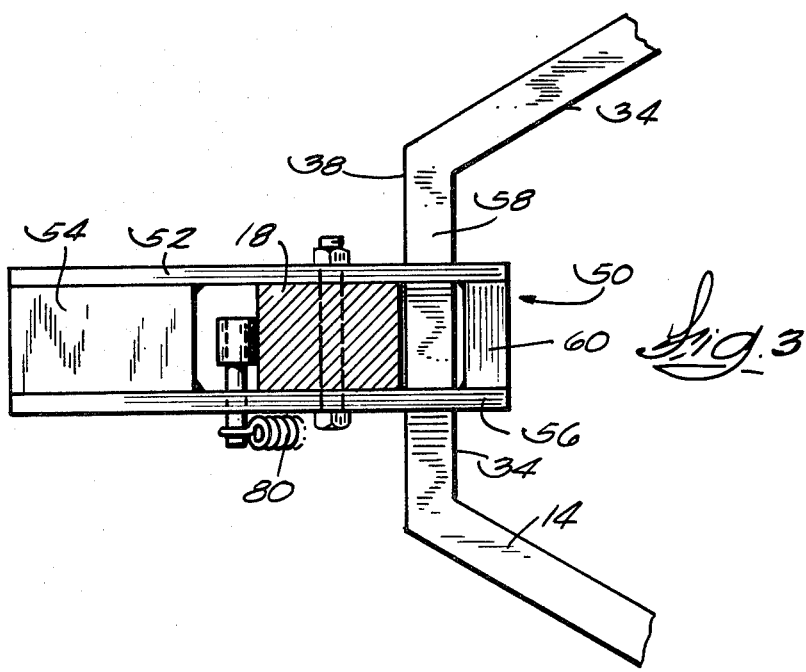
FIG. 3 is a cross section view taken along line 3—3 in FIG. 1.

FIG. 2 illustrates the operation of the jig such that the leg member 24 can be inserted into the opening 16 of the sheet pile. More specifically, the vertical bar 18 is oriented at an angle of about 45° with respect to the vertical surface 38 of the sheet pile 14 as shown in phantom in FIG. 2 and such that the second leg member 28 can be inserted into the opening 16 in the sheet pile. To facilitate such positioning of the jig 10, the lower end of the vertical bar 18 is mitre cut at an angle of about 45° with respect to the longitudinal axis of the vertical bar, this lower end 40 defined by the mitre cut extending downwardly and away from the intersection of the lower surface 42 of the first leg portion 26 with the vertical bar 18. The vertical bar 18 is then pivoted upwardly toward a vertical position, as shown in solid lines in FIG. 2, wherein the bar 18 is positioned adjacent the vertical surface 38 of the sheet pile 14 and with the first leg member 26 housed in the opening in the upper end of the sheet pile.

Means are further provided for selectively and releasably locking the sheet pile jig 10 in position against the sheet pile 14 once the leg member 24 has been inserted into the opening 16 and the sheet pile jig 10 pivoted to a position wherein it is positioned against the vertical surface 38 of the sheet pile 14. The means for releasably locking includes a pivotable pile holder or latch arrangement 50. The latch 50 includes an arm 52 pivotally connected intermediate its opposite ends by a bolt 53 to the vertical bar 18. One end of the arm 52 comprises a handle 54 and the opposite end 56 of the arm is positioned so as to extend over the upper end 58 of the sheet pile 14 and supports a downwardly extending leg 60 adapted to engage the surface 34 of the sheet pile 14 to prevent the jig 10 from accidentally releasing the sheet pile.

In operation, the arm 52 is pivoted to a first pivotal position as shown in FIG. 2 when the jig 10 is positioned such that the leg member 24 can be inserted into the opening 16, and once the sheet pile jig 10 has been positioned vertically and adjacent the sheet pile surface 38, the latch member 50 is then pivoted into the position shown in FIG. 1 wherein the downwardly extending leg 60 engages the surface 34 of the sheet pile.

Means are also provided for locking the pivotable arm 52 in a position wherein the downwardly extending leg 60 prevents movement of the jig 10 away from the sheet pile. In the illustrated construction, the means for locking includes a lever 70 adapted to be positioned against the lower surface 72 of the handle 54 and against the vertical surface 74 of the vertical bar 18 once the latch member 50 has been pivoted to the position wherein the downwardly extending leg 60 clampingly engages the surface 34 of the sheet pile 14. The lever 70 thus prevents counterclockwise pivotal movement of the latch arm 52 as seen in FIG. 1 and maintains the latch member 50 in a locked position.

Means are also provided for pivotably supporting the lower end of the lever 70 so as to permit it to move into and out of the locking position. This means for supporting the lever includes a clevis 76 which extends from the lower end of the vertical bar. A bolt 78 pivotally joins the lower end of the lever 70 to the clevis 76.

Means are also provided for biasing the lever 70 toward a position wherein the upper end of the lever 70 locks the latch member 50 in a latching position. This means for biasing includes a coil spring 80 having one end joined to the vertical bar 18 and an opposite end connected to the upper end of the lever 70 and for pulling it toward the surface 74 of the vertical bar 18.

A rope 82 is also connected to the upper end of the lever 70 such that the upper end of the lever 70 can be pulled away from the vertical bar 18.

One of the principal features of the sheet pile jig of the invention is that the sheet pile jig will automatically fall away from the sheet pile when the lever 70 is moved to a release position and when the hoisting cable permits the jig to fall away from the sheet pile. More particularly, in operation, when the operator desires to release the jig 10 from the sheet pile 14, the operator can pull the rope 82 and thereby pull the upper end of the lever 70 away from the vertical bar 18 to release the latch member 50. The handle portion 54 of the latch member 50 is constructed so as to be substantially heavier than the portion 56 of the latch and the downwardly extending leg 60. Accordingly, when the lever 70 is pulled away from the position shown in FIG. 1, the weight of the handle 54 causes the latch 50 to pivot to the release position shown in FIG. 2. Additionally, when the upward force of the hoist cable on the jig is relaxed, and once the latch member 50 is moved away from the latching position, the weight of the jig 10 will cause the jig to pivot to the position shown in phantom in FIG. 2 and the jig assembly 10 can then be removed from the opening 16 in the sheet pile for further use.

Various features of the invention are set forth in the following claims.

I claim:

1. An apparatus adapted to be connected to a hoisting cable and for lifting and carrying a sheet pile including a metal plate having an upper end and an opening adjacent said upper end, said apparatus including a rigid member having opposite ends, an upper end adapted to be joined to the hoisting cable and a lower end having a surface portion adapted to be positioned adjacent one side of the metal plate, a jig member projecting from said surface portion of said lower end of said rigid member, said jig member being adapted to extend through said opening, said jig member including a first leg portion extending transversely to said surface portion and including one end fixed to said surface portion and a free end adapted to extend through said opening, and a second leg portion extending transversely from said free end of said first leg portion and adapted to be positioned adjacent to the opposite side of said sheet pile and to extend downwardly, and means for selectively restraining said rigid member against said one side of said sheet pile, said means for selectively restraining including a latch member having an arm including opposite ends, said arm being pivotally joined to said rigid member for mvoement between a release position and a restraining position, said arm including one end adpated to extend over said upper end of said sheet pile when said latch member is in said restraining position, and a leg member joined to said one end of said arm and extending transversely to said arm, said leg member being adapted to be positionable adjacent said opposite side of said sheet pile when said latch member is in said restraining position and to extend downwardly toward said free end of said first leg portion and means for supporting said latch member such that said latch member will tend to pivot to said release position.

2. The apparatus as set forth in claim 1 wherein said rigid member includes an elongated rigid bar having a lower end, and wherein said jig member is integrally joined to said rigid bar adjacent said lower end, said lower end including a lower surface sloping downwardly from said jig member and away from said jig member.

3. Apparatus as set forth in claim 1 wherein said means for selectively restraining said rigid member against said side of said sheet pile includes means for releaseably restraining said latch member in said restraining position.

4. The apparatus as set forth in claim 3 wherein said means for releasably restraining said latch member includes a lever having opposite ends, one of said ends of said lever being pivotably connected to said rigid member and an opposite end selectively engageable with said latch member to support said latch member in said restraining position.

5. The apparatus as set forth in claim 4 wherein said one of said ends of said lever is pivotally joined to said rigid member at a point below said arm and engages the other of the ends of said arm to prevent downward pivotal movement of said other of said ends of said arm.

6. Apparatus as set forth in claim 4 wherein said means for releasably restraining said latch member further includes means for resiliently biasing said lever toward a position wherein said lever engages said latch member to support said latch member in said restraining position.

* * * * *